(12) United States Patent
Pedersen

(10) Patent No.: US 11,472,137 B2
(45) Date of Patent: Oct. 18, 2022

(54) MANUFACTURING METHOD AND TOOL FOR CARBON PARTS

(71) Applicant: Siemens Gamesa Renewable Energy A/S, Brande (DK)

(72) Inventor: David Stien Pedersen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 16 days.

(21) Appl. No.: 17/051,313

(22) PCT Filed: Apr. 24, 2019

(86) PCT No.: PCT/EP2019/060519
§ 371 (c)(1),
(2) Date: Oct. 28, 2020

(87) PCT Pub. No.: WO2019/211141
PCT Pub. Date: Nov. 7, 2019

(65) Prior Publication Data
US 2021/0362442 A1 Nov. 25, 2021

(30) Foreign Application Priority Data
May 4, 2018 (EP) ..................................... 18170847

(51) Int. Cl.
*B29C 70/52* (2006.01)
*B29C 65/00* (2006.01)
(Continued)

(52) U.S. Cl.
CPC ............ *B29C 70/523* (2013.01); *B29C 66/21* (2013.01); *B29C 66/7212* (2013.01);
(Continued)

(58) Field of Classification Search
None
See application file for complete search history.

(56) References Cited

U.S. PATENT DOCUMENTS 4,347,287 A * 8/1982 Lewis .................. B29C 70/527
428/394
5,139,862 A * 8/1992 Swift ..................... H01H 1/029
428/338
(Continued)

FOREIGN PATENT DOCUMENTS

CN 102734082 10/2012
CN 102808726 12/2012
(Continued)

OTHER PUBLICATIONS

Machine Translation of German Patent 10014376, Date Unknown.*
(Continued)

*Primary Examiner* — Jeffry H Aftergut
(74) *Attorney, Agent, or Firm* — Schmeiser, Olsen & Watts LLP

(57) ABSTRACT

A method of manufacturing a product including at least two carbon parts including the step of: manufacturing a first carbon part, manufacturing at least a second carbon part, providing on a surface of one of the first carbon part or second carbon part a plurality of protrusions including a carbon resin, joining together the first carbon part and the second carbon part in such a way that the plurality of protrusions is interposed between the first carbon part and second carbon part for providing physical and electrical connection is provided.

12 Claims, 3 Drawing Sheets

(51) Int. Cl.
*B29C 70/88* (2006.01)
*B29L 31/08* (2006.01)
(52) U.S. Cl.
CPC ......... *B29C 70/526* (2013.01); *B29C 70/882* (2013.01); *B29K 2995/0005* (2013.01); *B29L 2031/085* (2013.01)

(56) References Cited

U.S. PATENT DOCUMENTS

| | | | | |
|---|---|---|---|---|
| 5,264,060 | A | * | 11/1993 | Lambing ............... B29C 70/526 156/308.2 |
| 5,492,743 | A | * | 2/1996 | Schroll ................. B29C 70/525 428/36.1 |
| 5,632,837 | A | * | 5/1997 | Carmien .................. B25G 1/10 156/172 |
| 6,132,658 | A | * | 10/2000 | Davies ...................... B44F 9/02 156/247 |
| 2015/0210039 | A1 | | 7/2015 | Simmons et al. |
| 2018/0029686 | A1 | | 2/2018 | Restuccia et al. |
| 2018/0156202 | A1 | * | 6/2018 | Lipka ..................... F03D 80/30 |

FOREIGN PATENT DOCUMENTS

| | | |
|---|---|---|
| CN | 103781588 | 5/2014 |
| CN | 104334327 | 2/2015 |
| CN | 106768520 A | 5/2017 |
| DE | 10014376 A1 * | 7/2001 |
| EP | 0631203 A2 * | 12/1994 |
| FR | 2375379 A1 | 7/1978 |
| WO | 2018120384 A1 | 7/2018 |

OTHER PUBLICATIONS

International Search Report and Written Opinion in corresponding PCT Patent Application No. PCT/EP2019/060519 dated Oct. 29, 2019. 21 pages.
Partial European Search Report in corresponding European Patent Application No. 18170847.0 dated Oct. 22, 2018. 15 pages.

* cited by examiner

MANUFACTURING METHOD AND TOOL FOR CARBON PARTS

CROSS-REFERENCE TO RELATED APPLICATIONS

This application claims priority to PCT Application No. PCT/EP2019/060519, having a filing date of Apr. 24, 2019, which is based off of European Patent Application No. 18170847.0, having a filing date of May 4, 2018, the entire contents both of which are hereby incorporated by reference.

FIELD OF TECHNOLOGY

The following relates to a manufacturing method for improving the conductivity of carbon parts. The present invention further relates to a tool for pultrusion manufacturing of carbon parts with improved conductivity.

BACKGROUND

Carbon parts are normally used in various industrial fields. For example, carbon parts may be used in manufacturing blades for wind turbines to be able to make them longer and less heavy compared to blades manufactured using glass fiber material only. Such carbon parts may be typically manufactured through a pultrusion process.

In constructions of great dimensions like wind turbine, electrically conducting parts normally need to be electrical connected to the lightning protection system, including carbon parts of wind turbine blades, because carbon is an electrical conducting material.

To provide an efficient lightning protection system it is important that a good conductivity between contacting parts is achieved. This requires controlling the surface of contact between contacting parts. In case carbon parts are present, controlling the surface of contact between contacting parts may be problematic because the surfaces of such components, for example manufactured through pultrusion, are typically irregular.

One known solution to improve the electrical conduction between carbon parts is that of sanding the parts and inserting carbon fiber mattes between them.

Another known solution is that of bolting the carbon parts together on a lot of places.

Both these solutions are however time consuming and increase the material cost.

It is therefore still needed to provide a manufacturing process for manufacturing a product including at least two carbon parts, where the electrical conductivity between the carbon parts is improved in an efficient way, by reducing the manufacturing time and the material costs, with respect to the prior art.

SUMMARY

According to a first aspect of the invention, a method of manufacturing a product including at least two carbon parts is provided. The method comprises the step of:
  manufacturing a first carbon part,
  manufacturing at least a second carbon part,
  providing on a surface of one of the first carbon part or second carbon part a plurality of protrusions including a carbon resin,
  joining together the first carbon part and second carbon part in such a way that the plurality of protrusions is interposed between the first carbon part and second carbon part for providing physical and electrical connection.

The plurality of conducting protrusions permits improving the contact between the two carbon parts, with less material and costs, with respect to the prior art. Further, the distribution of protrusions can be controlled, thus providing the further advantage that the physical and electrical contact between the carbon parts can be provided with precision were desired.

According to embodiments of the present invention, the plurality of protrusions may comprise one or more dots, one or more strips, or a combination of dots and strips.

Dots and strips may be injected or deposited.

Dots and strips may be organized in a pattern.

According to specific embodiments of the present invention at least one of the first carbon part and second carbon part to be joined is manufactured by pultrusion. In such embodiments, the plurality of protrusions is provided on a surface of one of the first carbon part or second carbon part during a pultrusion step. In particular, the plurality of protrusions may be deposited on a surface of one of the first carbon part or second carbon part inside a pultrusion die.

According to a second aspect of the invention, a pultrusion die is provided. The pultrusion die longitudinally extends along a pultrusion direction between a first inlet section for receiving a plurality of fibers and a second outlet section for delivering a plurality of resin-soaked fibers, wherein the pultrusion die comprises a band including a plurality of protrusions including a carbon resin, the band being disposed in such a way that the plurality of protrusions is transferred from the band to the plurality of fibers when the plurality of fibers crosses the pultrusion die from the inlet section to the outlet section.

According to an embodiment of the present invention the band is annularly shaped around a band axis, transversal to the pultrusion direction, the annular band being able to rotate around the band axis.

The pultrusion die above described permits, during a pultrusion process, the automatization of the protrusions depositions on the carbon parts to be later joined together The present invention may be advantageously used to manufacture carbon parts including carbon resin protrusions to be integrated in a wind turbine blade.

It has to be noted that embodiments of the invention have been described with reference to different subject matters. In particular, some embodiments have been described with reference to device (pultrusion die) type whereas other embodiments have been described with reference to the method. However, a person skilled in the art will gather from the above and the following description that, unless other notified, in addition to any combination of features belonging to one type of subject matter also any combination between features relating to different subject matters, in particular between features of the method and features of the apparatus is considered as to be disclosed with this document.

The aspects defined above and further aspects of the present invention are apparent from the examples of embodiment to be described hereinafter and are explained with reference to the examples of embodiment. The present invention will be described in more detail hereinafter with reference to examples of embodiment but to which the present invention is not limited.

BRIEF DESCRIPTION

Some of the embodiments will be described in detail, with reference to the following figures, wherein like designations denote like members, wherein.

DETAILED DESCRIPTION

Figure 1:
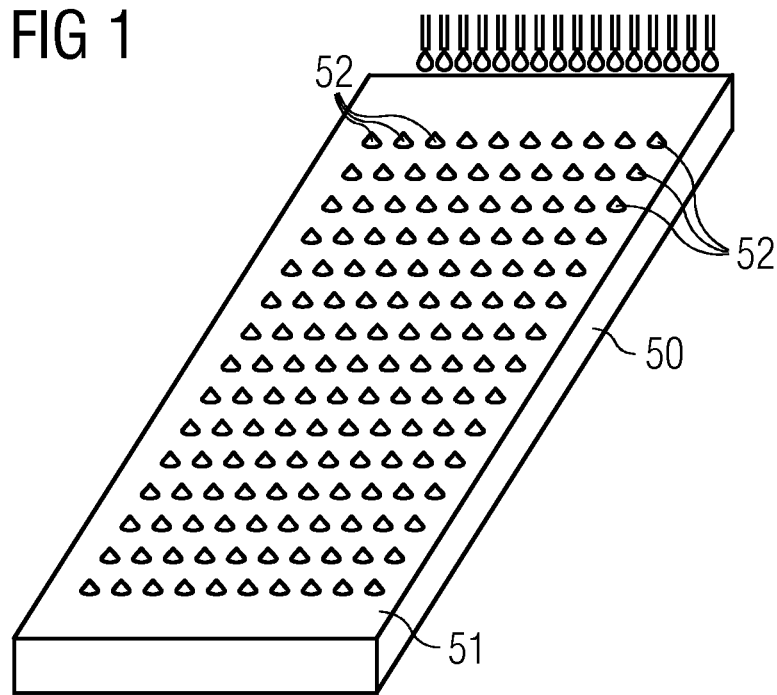
FIG. 1 depicts a schematic axonometric view of a first product obtained with the method.

The illustrations in the drawings are schematic. It is noted that in different figures, similar or identical elements are provided with the same reference signs.

FIG. 1 shows a carbon part 50 on which plurality of protrusions 52 including a carbon resin are deposited or injected over a surface 51 of the carbon part 50.

Particularly the carbon part 50 is made of a composite material including a plurality of carbon fibers and a resin.

The protrusions 52 are in form of dots and are distributed according to a rectangular pattern including columns and rows.

According to other embodiments of the present invention (not shown) the plurality of dots 52 may be distributed according to any other pattern.

The carbon part 50 may be joined to another carbon part (not shown), in such a way that the plurality of protrusions are interposed between the first carbon part and second carbon part for providing physical and electrical connection. The protrusions 52 may be provided on both carbon parts to be joined.

Figure 2:
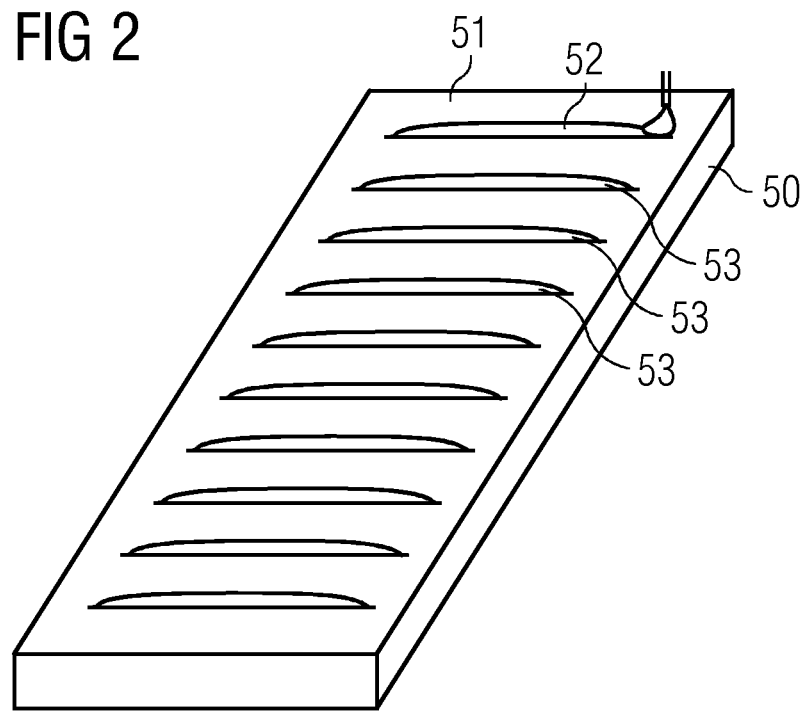
FIG. 2 depicts a schematic axonometric view of a second product obtained with the method.

FIG. 2 shows a carbon part 50 on which a plurality of protrusions 53 including a carbon resin are deposited or injected over a surface 51.

Differently from the embodiment of FIG. 1, the protrusions 53 are in form of parallel strips. In case the carbon part 50 is a composite material including a plurality of carbon fibers the strips 50 may be orthogonal or parallel or inclined with respect to the strips 50.

Figure 3:
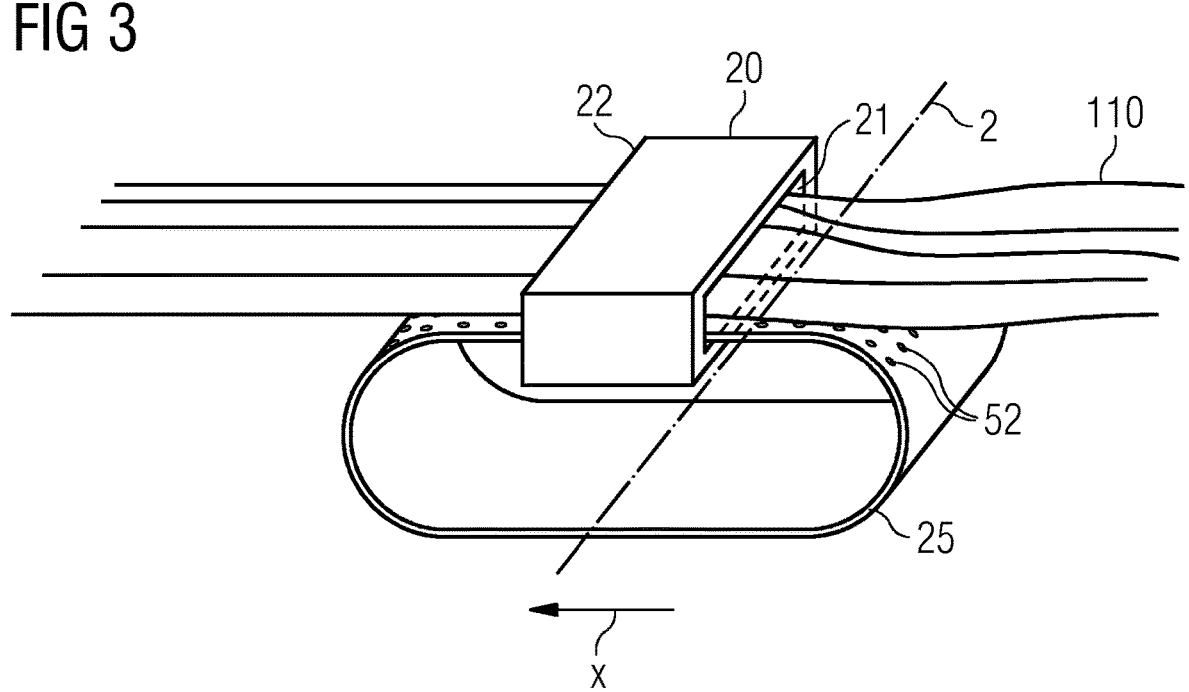
FIG. 3 depicts a schematic axonometric view of pultrusion die.

FIG. 3 shows a pultrusion die 20, which can be used for automatically depositing the plurality of protrusions dots 52 of the embodiment of FIG. 1.

The pultrusion die 20 longitudinally extends along a pultrusion direction X between a first inlet section 21 for receiving a plurality of fibers 110 and a second outlet section 22 for delivering a plurality of resin-soaked fibers.

The pultrusion die 20 comprises a band 25 including the plurality of protrusions 52.

The band 25 is annularly shaped around a band axis Z, transversal to the pultrusion direction X, and is able to rotate around the band axis Z.

According to other embodiments (not shown) of the present invention, the band is open and extends between two band ends.

In both embodiments at least a portion of the band translates between the inlet section 21 and the outlet section 22.

The band 25 is disposed along an inner side of the pultrusion die 20, in such a way that the plurality of protrusions 52 are transferred from the band 25 to the plurality of fibers 110 when the plurality of fibers 110 crosses the pultrusion die 20 from the inlet section 21 to the outlet section 22.

According to other embodiments of the present invention (not shown), the pultrusion die 20 comprises the plurality of strip protrusions 53 to be transferred to the plurality of fibers 110.

Figure 4:
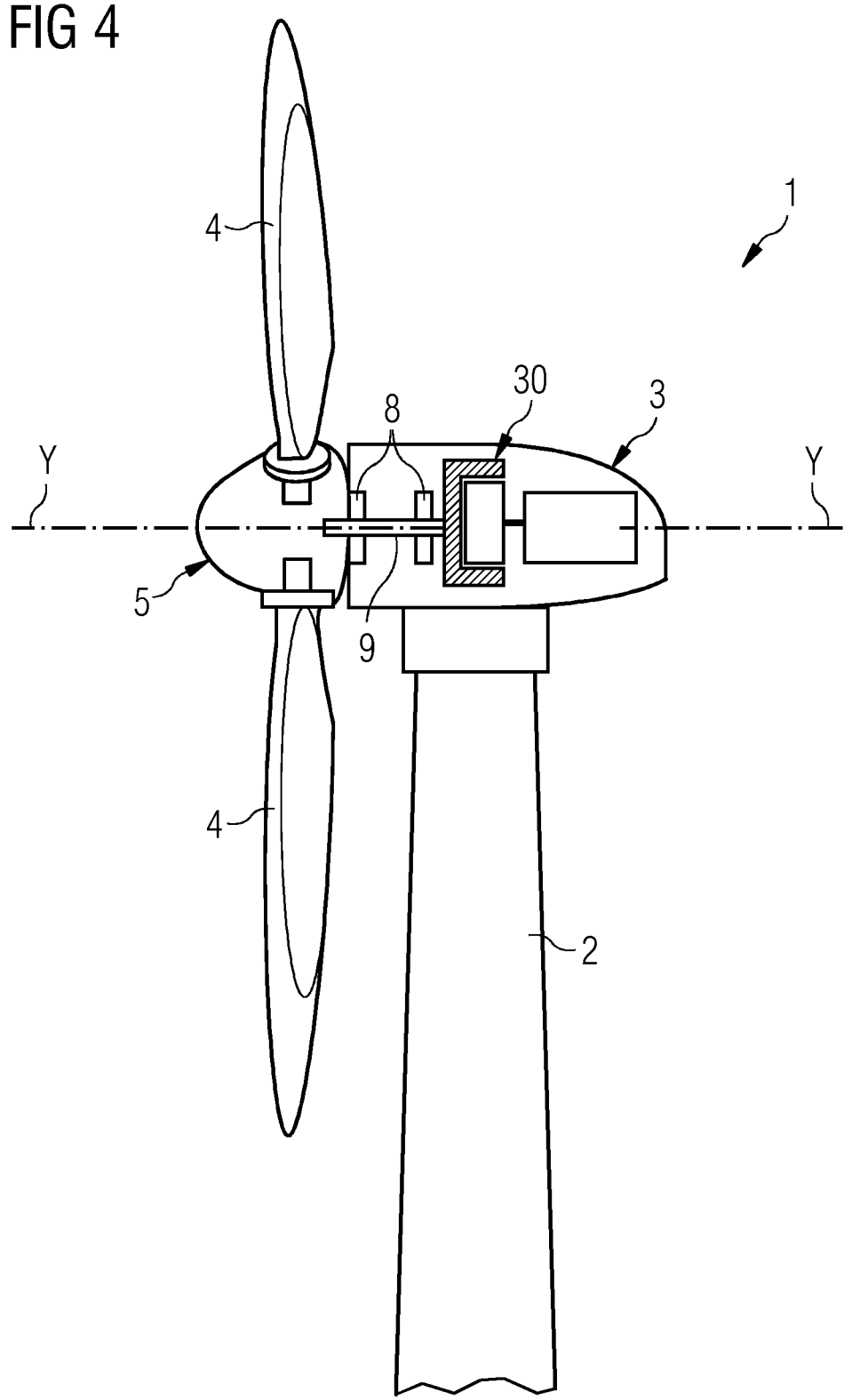
FIG. 4 depicts a schematic section of a wind turbine including a rotor blade comprising a product manufactured.

FIG. 4 shows a wind turbine 1 according to the embodiment of the present invention. The wind turbine 1 comprises a tower 2, which is mounted on a non-depicted fundament. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational axis Y. The blades 4 extend radially with respect to the rotational axis Y.

The wind rotor 5 is rotationally coupled with an electric generator 30 by means of a rotatable main shaft 9.

According to other possible embodiments of the present invention (not represented in the attached figures), the wind rotor 5 is rotationally coupled directly with the electric generator 30 (direct-drive generator configuration).

A schematically depicted bearing assembly 8 is provided in order to hold in place the rotor 5. The rotatable main shaft 9 extends along the rotational axis Y.

The blades 4 comprise one or more carbon parts 50 obtained through the present invention. Such carbon parts 50 are joined to other portions of the blades, which may be also obtained according to the present invention, in order to improve the electrical conductivity of the overall blades. This improves the performances of the lightning protection system of the blade 4.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of manufacturing a product including at least two carbon parts, the method comprising:
   manufacturing a first carbon part;
   manufacturing a second carbon part, wherein the first carbon part and the second carbon part each comprise a composite material including a plurality of fibers;
   transferring a plurality of protrusions including a carbon resin from a band disposed proximate a pultrusion die to a surface of one of the first carbon part or the second carbon when the plurality of fibers crosses the pultrusion die from an inlet section of the pultrusion die to an outlet section of the pultrusion die; and
   joining together the first carbon part and the second carbon part to form the product in such a way that the plurality of protrusions are interposed between the first carbon part and the second carbon part for providing a physical and electrical connection.

2. The method of manufacturing as claimed in claim 1, wherein the plurality of protrusions comprise at least one dot.

3. The method of manufacturing as claimed in claim 1, wherein the plurality of protrusions comprise at least one strip.

4. The method of manufacturing as claimed in claim 1, wherein the plurality of protrusions are injected on the surface of one of the first carbon part or the second carbon part.

5. The method of manufacturing as claimed in claim 1, wherein the plurality of protrusions are deposited on the surface of one of the first carbon part or the second carbon part.

6. The method of manufacturing as claimed in claim 1, wherein the plurality of protrusions are organized in a pattern.

7. The method of manufacturing as claimed in claim 1, wherein at least one of the first carbon part and the second carbon part is manufactured by pultrusion.

8. The method of manufacturing as claimed in claim 7, wherein the plurality of protrusions are provided on the surface of one of the first carbon part or the second carbon part during a pultrusion step.

9. The method of manufacturing as claimed in claim 8, wherein the plurality of protrusions are deposited on the surface of one of the first carbon part or the second carbon part inside a pultrusion die.

10. The method of manufacturing as claimed in claim 1, wherein one of the first carbon part or the second carbon part is a portion of a wind turbine blade.

11. A pultrusion die longitudinally extending along a pultrusion direction between an inlet section for receiving a plurality of fibers and an outlet section for delivering a plurality of resin-soaked fibers, the pultrusion die comprising:
   a band including a plurality of protrusions including a carbon resin, the band being disposed in such a way that the plurality of protrusions are transferred from the band to the plurality of fibers when the plurality of fibers cross the pultrusion die from the inlet section to the outlet section.

12. The pultrusion die as claimed in claim 11, wherein the band is annularly shaped around a band axis, transversal to the pultrusion direction, the band being able to rotate around the band axis.

\* \* \* \* \*